United States Patent
John et al.

(10) Patent No.: US 11,075,973 B2
(45) Date of Patent: Jul. 27, 2021

(54) SYSTEMS AND METHODS FOR PRIORITIZED SIP SERVICES USING UE-SPECIFIED SIP REGISTER MESSAGES

(71) Applicant: Verizon Patent and Licensing Inc., Arlington, VA (US)

(72) Inventors: Toby Varughese John, Murphy, TX (US); Shashi Kotvali, Frisco, TX (US); Bibi M. Hakimzadeh, Fort Worth, TX (US); James S. Abraham, Carrollton, TX (US); Temitola I. Okunoren, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 34 days.

(21) Appl. No.: 16/661,910

(22) Filed: Oct. 23, 2019

(65) Prior Publication Data
US 2021/0126959 A1    Apr. 29, 2021

(51) Int. Cl.
*H04W 48/14* (2009.01)
*H04L 29/06* (2006.01)
*H04W 4/12* (2009.01)

(52) U.S. Cl.
CPC ......... *H04L 65/80* (2013.01); *H04L 65/1006* (2013.01); *H04L 65/1016* (2013.01); *H04L 65/1073* (2013.01); *H04W 4/12* (2013.01)

(58) Field of Classification Search
CPC . H04L 65/80; H04L 65/1006; H04L 65/1016; H04L 65/1073

USPC .................................................. 370/328–329
See application file for complete search history.

(56) References Cited

U.S. PATENT DOCUMENTS

| 2008/0305794 | A1* | 12/2008 | Mukaiyama | ........ H04L 67/1008 |
| | | | | 455/435.1 |
| 2017/0288886 | A1* | 10/2017 | Atarius | ............... H04L 65/1063 |
| 2019/0068785 | A1* | 2/2019 | Canas | .................. H04M 3/5116 |
| 2020/0120629 | A1* | 4/2020 | Christopher | ........ H04L 61/6022 |

OTHER PUBLICATIONS

H. Schulzrinne, "The tel URI for Telephone Numbers," Network Working Group Request for Comments 3966, Dec. 2004.

* cited by examiner

*Primary Examiner* — Congvan Tran (57) ABSTRACT

A system described herein may provide for the prioritization of Session Initiation Protocol ("SIP") messages, transmitted by a User Equipment ("UE"), based on a priority class indicator ("PCP") included in a registration message (e.g., a SIP REGISTER message) from the UE. The PCI may be included in a contact header, a SIP contact Uniform Resource Identifier ("URI"), and/or some other portion of the registration message. A Universal Integrated Circuit Card ("UICC") may store information indicating the priority class (e.g., in an Access Control Class ("ACC") Elementary File ("EF")). One or more network components, such as a Call Session Control Function ("CSCF") may prioritize SIP messages from the UE based on the priority class indicator included in the registration message by the UE.

20 Claims, 7 Drawing Sheets

SYSTEMS AND METHODS FOR PRIORITIZED SIP SERVICES USING UE-SPECIFIED SIP REGISTER MESSAGES

BACKGROUND

Wireless telecommunication networks provide network connectivity to a variety of different users, such as government agencies, first responders, corporate entities, private individuals, etc. These users send messages (e.g., text messages, instant messages, etc.) using devices that are connected to the wireless telecommunications networks. Some messaging techniques employ the use of Session Initiation Protocol ("SIP") messaging to facilitate the transmission of messages and/or the establishment of voice calls or other services.

DETAILED DESCRIPTION OF THE PREFERRED EMBODIMENTS

The following detailed description refers to the accompanying drawings. The same reference numbers in different drawings may identify the same or similar elements.

Embodiments described herein provide for the prioritized treatment of messages sent by User Equipment ("UEs") associated with a messaging priority class. Examples of UEs associated with a messaging priority class may include UEs associated with first responders (e.g., law enforcement, firefighters, paramedics, etc.), governmental agencies, and/or other entities that require and/or are otherwise entitled to prioritized message services. "Prioritized" messages may be processed (e.g., forwarded) by a wireless network prior to, and/or otherwise in favor of, "non-prioritized" messages, for example when excessive congestion or load prevents the expedient processing of messages. In some embodiments, prioritized messages may be queued separately from non-prioritized messages, and/or different queues may be associated with different priority levels (e.g., where messages in queues associated with higher priority levels may be processed before messages in queues associated with lower priority levels, and/or may be weighted more heavily for a weighted queueing technique than messages in queues associated with lower priority levels).

Figure 1A:
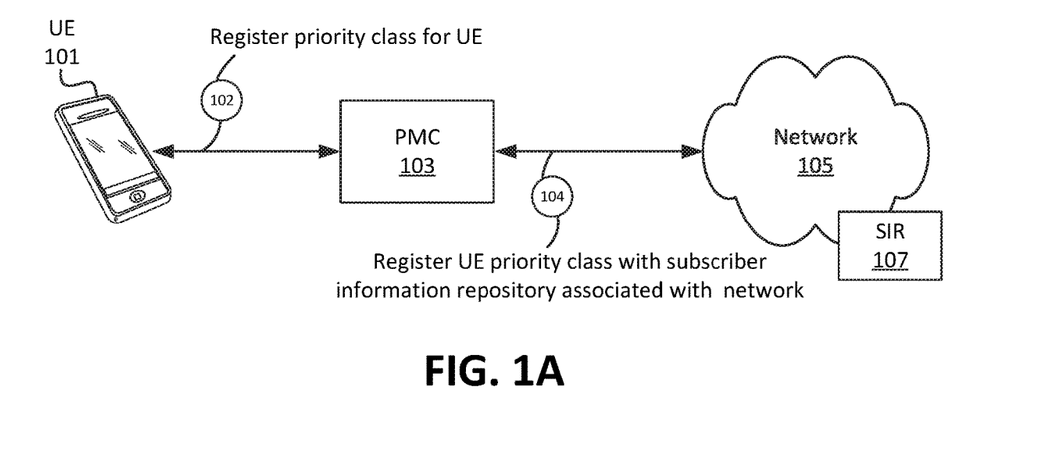
FIG. 1A illustrates an initial registration or provisioning of a messaging priority class for a User Equipment ("UE"), in accordance with some embodiments.

For instance, as shown in FIG. 1A, a particular UE 101 may be registered (at 102) with a messaging priority class. In some aspects, when UE 101 is initially provisioned for network 105 (and/or at some other time), UE 101 may be registered with Priority Messaging Component ("PMC") 103. The indicated priority class may be selected from a group of different priority classes, where each priority class receives differentiated priority treatment by network 105. For instance, five, ten, fifteen, or some other quantity of priority classes may be configurable. The particular priority class for UE 101 may, in some embodiments, be selected based on an entity that owns and/or operates UE 101. For instance, a particular UE 101 that is owned and/or operated by a fire department may be associated with a higher access class than another UE 101 that is owned and/or operated by a private individual.

The provisioning may include providing identifying information associated with UE 101 to PMC 103. The identifying information may include, for example, a Mobile Directory Number ("MDN") associated with UE 101, an International Mobile Station Equipment Identity ("IMEI") value, an International Mobile Subscriber Identity ("IMSI") value, identifying information stored by a Universal Integrated Circuit Card ("UICC") associated with UE 101, a SIP address associated with UE 101 or a user of UE 101, and/or some other suitable identifying information.

In some embodiments, PMC 103 may generate an authentication token for UE 101. PMC 103 may, in some embodiments, derive the authentication token from some or all of the identifying information of UE 101. For instance, PMC 103 may perform a cryptographic hash, and/or some other function, on some or all of the identifying information of UE 101 to generate the authentication token. PMC 103 may store the authentication token, provide the authentication token to UE 101, and/or provide the authentication token to one or more other devices or systems.

The registration may also include storing information locally at UE 101, such as on a UICC associated with UE 101. For instance, the UICC may include a data structure in which an Access Control Class ("ACC") is stored (e.g., an ACC Elementary File ("EF")), indicating a priority level of UE 101. In accordance with some embodiments, the ACC EF of the UICC (and/or some other suitable data structure stored locally at UE 101) may store a value that indicates the messaging priority class associated with UE 101. The value may be indicated by, for instance, a numerical value, a setting of one or more bits in a sequence of bits, a word or phrase, and/or using some other suitable indicator.

PMC 103 may, in some embodiments, also register (at 104) UE 101 with network 105. For instance, PMC 103 may communicate with Subscriber Information Repository ("SIR") 107 of network 105. In some embodiments, SIR 107 may be, may include, may be implemented as part of, and/or may be communicatively coupled with a Home Subscriber Server ("HSS"), Unified Data Management function ("UDM"), Unified Data Repository ("UDR"), and/or some other network component that stores and/or provides information regarding UE 101 and/or subscription information associated with UE 101. For example, SIR 107 may provide or implement an interface via which a Call Session Control Function ("CSCF"), a Messaging Application Server ("MAS"), and/or other device or system of network 105 may communicate with SIR 107 to obtain information associated with UE 101 (e.g., a priority class associated with UE 101 and/or other information associated with UE 101).

PMC 103 may, for example, provide some or all of the identifying information associated with UE 101 mentioned above (e.g., MDN, IMSI, IMEI, and/or other identifying information) to network 105 (e.g., to SIR 107). PMC 103 may also provide, to network 105, an indication of the priority class associated with UE 101. In some embodiments, PMC 103 may also provide an authentication token (e.g., as previously discussed above) to network 105, in conjunction with identifying information for UE 101 and an indication of the priority class associated with UE 101, so that network 105 can subsequently verify the access class of UE 101 when communicating with UE 101.

Figure 1B:
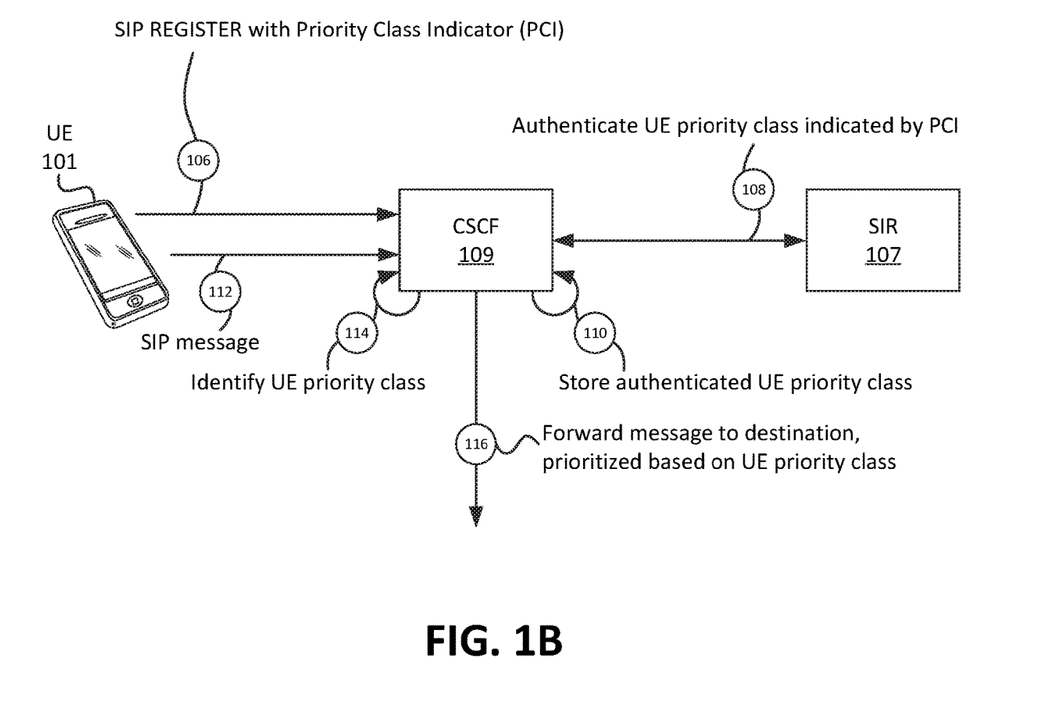
FIG. 1B illustrates a UE indicating the messaging priority class associated with the UE in a SIP REGISTER message, in accordance with some embodiments.

As shown in FIG. 1B, UE 101 may output (at 106) a SIP REGISTER message to CSCF 109. UE 101 may output the SIP REGISTER message upon an initial provisioning process, when UE 101 is first powered on, on a periodic or intermittent basis, and/or based on one or more other triggering events. In accordance with some embodiments, the SIP REGISTER message may include a Priority Class Indicator ("PCP"), which may indicate the priority class associated with UE 101 (e.g., as registered at 102). As described below, a SIP messaging component of UE 101 may obtain the priority class from a UICC associated with UE 101 (e.g., by reading an ACC EF stored by the UICC). In some embodiments, UE 101 may also include an authentication token with the message (e.g., in header information associated with the message and/or in a body of the message).

CSCF 109 may receive the message, and may authenticate and/or verify the priority class of UE 101 before storing information indicating the priority class of UE 101, indicated in the SIP REGISTER message. For example, CSCF 109 may communicate (at 208) with SIR 107 to verify the priority class of UE 101, as indicated in the SIP REGISTER message from UE 101 (e.g., as indicated by the PCI included in the SIP REGISTER message). For example, CSCF 109 may query SIR 107 (e.g., based on identifying information regarding UE 101) to determine with which priority classes, if any, UE 101 is associated. In some embodiments, CSCF 109 may provide an authentication token, included in the message from UE 101, to SIR 107 to verify the authenticity of the authentication token. In some embodiments, SIR 107 may communicate with PMC 103 to verify the priority class associated with UE 101, and/or to authenticate the authentication token. In addition to, or in lieu of communicating with SIR 107, CSCF 109 may communicate directly with PMC 103 to determine with which priority classes, if any, UE 101 is associated, and/or to authenticate the authentication token.

Once the priority class associated with UE 101 is authenticated/verified, CSCF 109 may store (at 110) the priority class associated with UE 101, in order to prioritize subsequent messages from UE 101 in accordance with the priority class. In some embodiments, CSCF 109 may forgo verifying the priority class (e.g., may forgo communicating with SIR 107 (at 108) and/or with PMC 103 to verify the priority class). In such embodiments, CSCF 109 may store (at 110) the priority class associated with UE 101 without authenticating or verifying (at 108) the priority class.

At some time after UE 101 has registered (at 106) with CSCF 109, and after CSCF has stored (at 110) the priority class associated with UE 101, UE 101 may output (at 112) a SIP message (e.g., a voice call setup message, a text-based message, and/or some other type of SIP message) to CSCF 109.

CSCF 109 may identify (at 114) the priority class of UE 101 (e.g., as previously stored at 110) and prioritize the message according to the priority class of UE 101. For example, as discussed above, CSCF 109 may process the message before processing other messages that are associated with lower priority class, may place the message in a queue associated with the priority class (e.g., where messages associated with other priority classes may be placed in other queues), assign a weight to the message for a weighted queueing algorithm (where the weight is based on the priority class), and/or otherwise prioritize the message based on the identified priority class. In some embodiments, CSCF 109 may process, queue, forward, or otherwise handle the message prior to processing, queuing, or forwarding other messages from other UEs (e.g., messages of a lower priority class, or messages that are not associated with a priority class), even if the other messages were received by CSCF 109 before the message from UE 101.

CSCF 109 may proceed to forward (at 116) toward a destination of the message. For example, CSCF 109 may forward the message to a MAS and/or some other device or system that implements a messaging service, by which the message from UE 101 may be forwarded to its intended recipient. As described herein, CSCF 109 may add information to the message (e.g., may add a Resource Priority Header ("RPH")) to indicate the priority class of UE 101, based on which the MAS (and/or some other recipient of the message) may also prioritize the message.

The use of a PCI in SIP REGISTER messages, in accordance with embodiments described herein, may facilitate the priority handling of messages, based on a sender of the messages (e.g., a UE 101 from which the messages are sent). By storing a priority class associated with UE 101, CSCF 109 may not need to communicate with other devices or systems when receiving a SIP message from UE 101 to determine how the SIP message should be handled. Further, some or all of a SIP message may be encrypted and/or otherwise unreadable by CSCF 109, which may make it difficult or impossible for CSCF 109 to analyze the messages. Thus, maintaining a priority class associated with UE 101 allows CSCF 109 to prioritize SIP messages from UE 101 without needing to analyze the messages.

Figure 2:
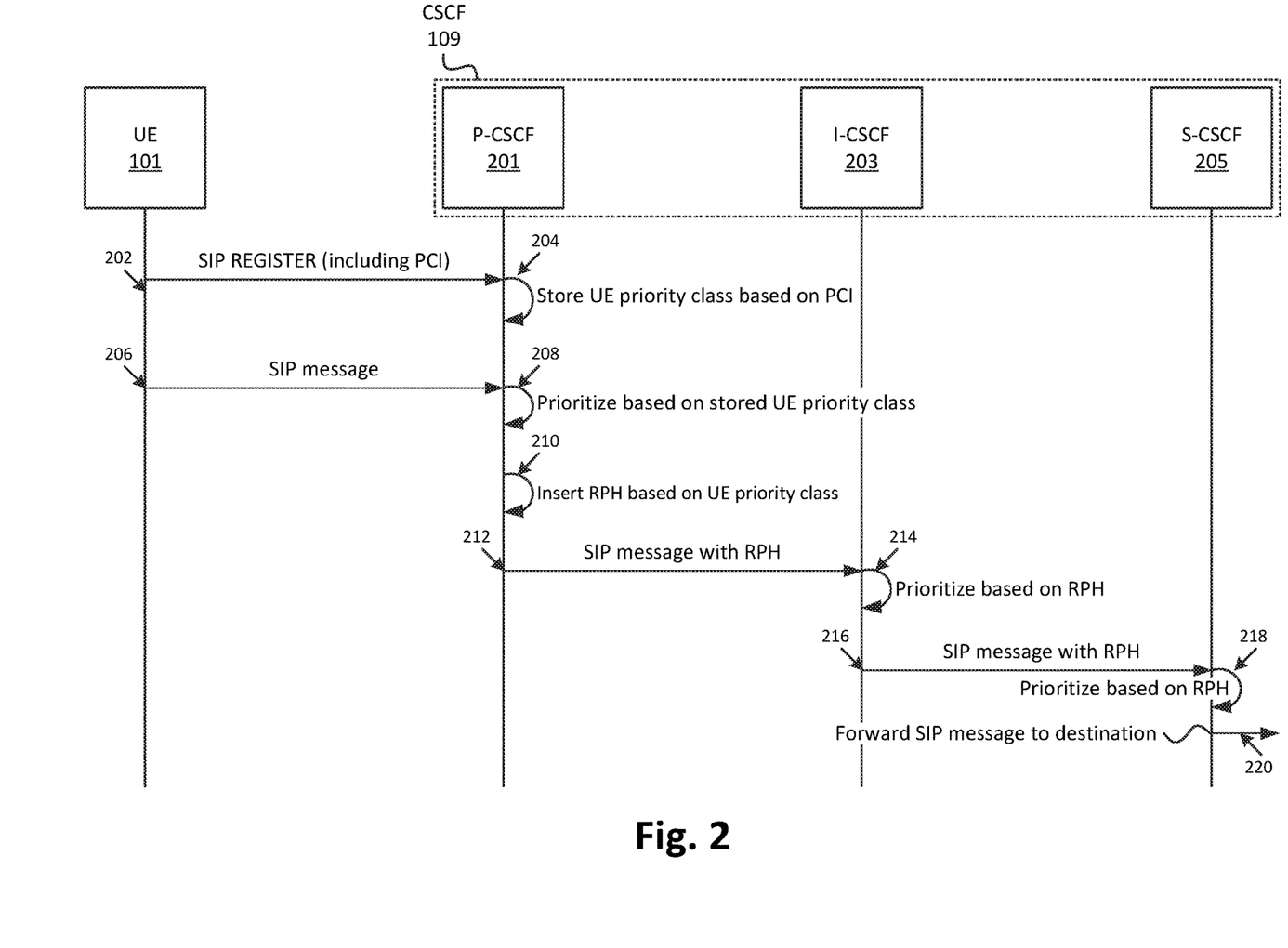
FIG. 2 illustrates an example signal flow, in which a Call Session Control Function ("CSCF") may prioritize a SIP message from a UE based on a Priority Class Indicator ("PCI") provided by the UE via a SIP REGISTER message, in accordance with some embodiments.

FIG. 2 illustrates an example signal flow, in which CSCF 109 may prioritize a SIP message from a UE based on a PCI provided by the UE via a SIP REGISTER message, in accordance with some embodiments. As shown, UE 101 may communicate with CSCF 109, which may include Proxy CSCF ("P-CSCF") 201, Interrogating CSCF ("I-CSCF") 203, and Serving CSCF ("S-CSCF") 205. For the sake of brevity, certain signals, which may in practice be passed between the illustrated devices and/or systems in some embodiments (e.g., acknowledgement messages and/or other messages) are not shown in this figure.

Figure 3:
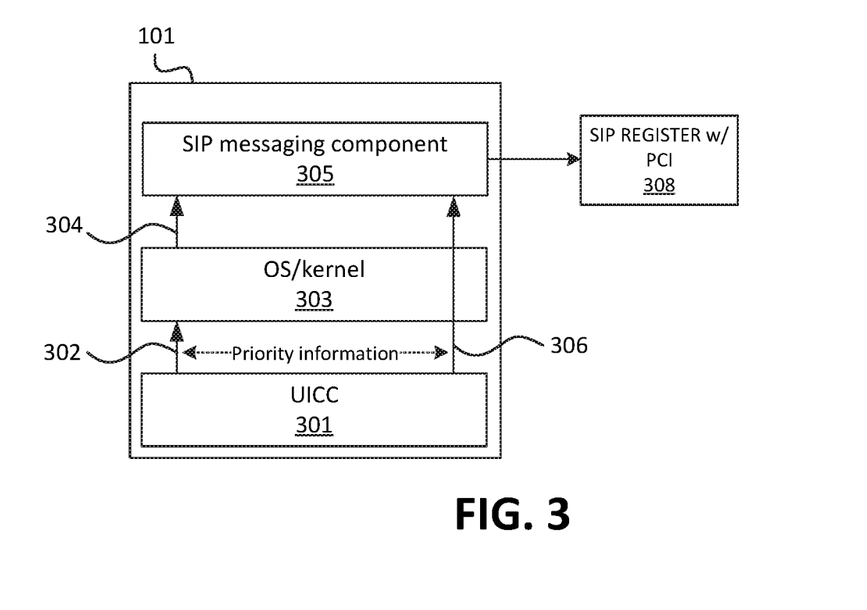
FIG. 3 illustrates an example of a SIP messaging component, executing on a UE that is associated with a messaging priority class, obtaining priority information from a Universal Integrated Circuit Card ("UICC") and providing the priority information via a PCI included in a SIP REGISTER MESSAGE.

For example, UE 101 may output (at 202) a SIP REGISTER message to P-CSCF 201. The SIP REGISTER message may include a PCI associated with UE 101. FIG. 3 illustrates one or more functional components of UE 101, such as UICC 305, operating system ("OS")/kernel 303, and SIP messaging component 305, which may facilitate the outputting (at 202) of the SIP REGISTER message with the PCI. As similarly discussed above, UICC 305 may receive and store priority class information for UE 101, such as in an ACC EF portion of UICC 305. In some embodiments, priority class information may be provided to UICC 305 when UE 101 is purchased, provisioned with network 105, etc. Additionally, or alternatively, the priority information may be provided to UICC 305 at some other time (e.g., after UE 101 has been initially provisioned with network 105, such as via an over-the-air ("OTA") update or through some other suitable process).

In some embodiments, OS/kernel 303 of UE 101 may obtain (at 302) the priority class information from UICC 305. For example, OS/kernel 303 may read the contents of UICC 305 to determine the priority class information. In some embodiments, OS/kernel 303 may store the priority class (e.g., as a global system variable). SIP messaging component 305 may obtain (at 304) the priority class information from OS/kernel 303 (e.g., via an application programming interface ("API") or some other suitable communication pathway). Additionally, or alternatively, SIP messaging component 305 may read (at 306) UICC 305 directly. Once SIP messaging component 305 obtains the priority class information for UE 101, SIP messaging component 305 may generate and output SIP REGISTER message 308, which may include the PCI.

Figure 4:
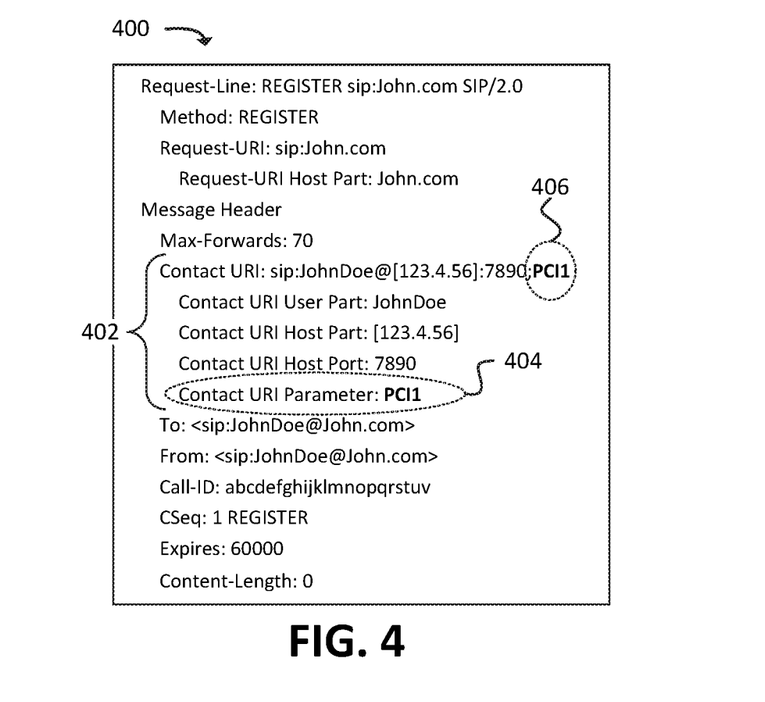
FIGS. 4 and 5 illustrate example SIP REGISTER messages which may be used to indicate a PCI, in accordance with some embodiments.
Figure 5:
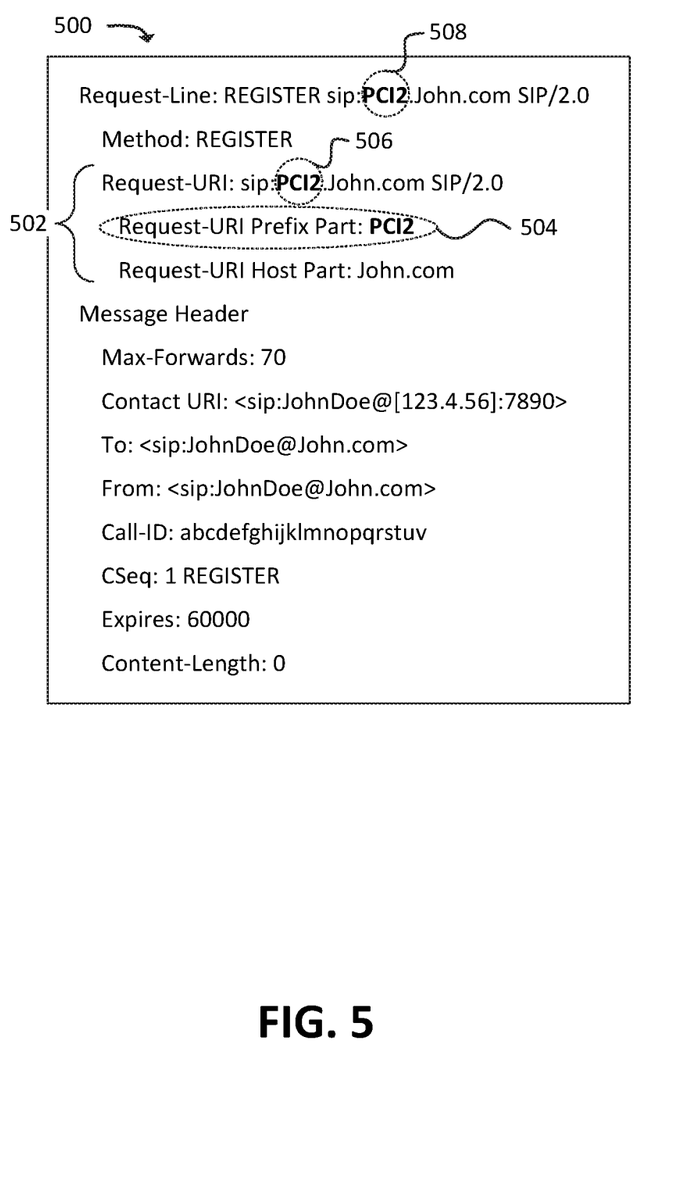

FIGS. 4 and 5 illustrate example SIP REGISTER messages 400 and 500, respectively. For example, as shown in FIG. 4, SIP REGISTER message 400 (e.g., which may be generated by SIP messaging component 305 and outputted at 202) may include contact header 402. In accordance with some embodiments, contact header 402 may include a parameter, such as Contact Uniform Resource Identifier ("URI") Parameter 404, that specifies the PCI associated with UE 101. In this example, the PCI is represented by the string "PCI1", and is bolded for emphasis in this figure. In practice, the PCI may be represented in some other way, such as a numerical value, a word or phrase, symbols or punctuation, and/or some other arrangement of alphanumeric characters. As shown, the parts of contact header 402 (i.e., "Contact URI User Part," "Contact URI Host Part," "Contact URI Host Port," and "Contact URI Parameter") may be concatenated and/or otherwise combined to form the overall "Contact URI." As shown here, the "Contact URI" may include portion 406, which denotes the PCI (i.e., the portion of the Contact URI that indicates "PCI1").

As shown in FIG. 5, SIP REGISTER message 500 may indicate the PCI via message part 502, which may be a "Request-URI" message part. The "Request-URI" message part 502 may include a "Request-URI Prefix Part" 504, which may be used to indicate the PCI associated with UE 101. For example, in this example, the example PCI "PCI2" is indicated in "Request-URI Prefix Part" 504 (and is bolded for emphasis in this figure). As similarly discussed above, "PCI2" may be one possible representation of a particular priority class associated with UE 101, while in practice, other values or arrangements of values are possible (e.g., "*273" and/or some other value). As further shown, "Request-URI Prefix Part" 504, which indicates the PCI, may be reflected in other portions of SIP REGISTER message 500 (e.g., in the "Request-URI" part (e.g., at 506) and/or the "Request-Line" part (e.g., at 508)).

Returning to FIG. 2, P-CSCF 201 may receive the SIP REGISTER message (e.g., which may include the PCI as part of a contact header (e.g., as discussed with respect to FIG. 4), as part of a URI (e.g., in a URI prefix, as discussed with respect to FIG. 5), and/or in some other part of the SIP REGISTER message). P-CSCF 201 may store (at 204) an indication of the priority class of UE 101 based on the PCI indicated in the SIP REGISTER message. In some embodiments, P-CSCF 201 may store the PCI itself, and/or a value that is mapped to or otherwise derived from the PCI (where this value indicates a priority level and/or other information which P-CSCF 201 can use to prioritize or otherwise handle messages associated with UE 101). Referring to the examples of FIGS. 4 and 5, P-CSCF may store information associating the SIP Contact URI "sip:JohnDoe@John.com" with "PCI1" (or a value derived therefrom) when receiving example SIP REGISTER message 400, or information associating the SIP Contact URI "sip:JohnDoe@John.com" with "PCI2" (or a value derived therefrom) when receiving example SIP REGISTER message 500.

While not shown in this figure, P-CSCF 201 may authenticate or verify the priority class of UE 101 prior to storing (at 204) the priority class (e.g., may communicate with SIR 107, PMC 103, and/or some other device or system, as similarly described above with respect to FIG. 1B). While also not shown here, P-CSCF 201 may provide an acknowledgement or confirmation to UE 101 that the registration of UE 101 has been successfully completed, and/or that P-CSCF 201 has stored an indication of the priority class of UE 101.

As further shown, after the registration process (at 202), UE 101 may output (at 206) a SIP message to P-CSCF. The SIP message may be, for example, a call setup request, a text-based message, and/or some other type of SIP message. This message may include a URI associated with UE 101 (and/or associated with a user of UE 101). For example, referring to an example scenario in which the SIP REGISTER message is similar to those shown in FIGS. 4 and 5, the SIP message (outputted at 206) may also include "sip:JohnDoe@John.com" as a SIP Contact URI.

P-CSCF 201 may receive this SIP message, and may determine that the SIP Contact URI of the SIP message matches the SIP Contact URI for which the priority class was previously stored (at 204). Based on determining that the SIP Contact URI of the SIP message matches the previously stored SIP Contact URI, P-CSCF 201 may prioritize (at 208) the SIP message in accordance with the determined priority class. For example, P-CSCF 201 may place the SIP message in a particular queue that is associated with the determined priority class (e.g., where P-CSCF 201 maintains different queues for messages of different priority classes), assign a weight (e.g., for a weighted queueing algorithm) to the SIP message that is based on the determined priority class, and/or otherwise handle the SIP message in a prioritized manner in accordance with the determined priority class).

In some embodiments, handling the SIP message may include forwarding the SIP message to an appropriate I-CSCF. In some embodiments, prior to forwarding the SIP message, P-CSCF 201 may insert (at 210) header information, such as RPH information, into the SIP message. The RPH may include an identifier of the priority class associated with UE 101 (e.g., may include the PCI indicated by UE 101, and/or a value derived from and/or otherwise associated with the PCI).

P-CSCF 201 may forward (at 212) the SIP message, including the RPH, to I-CSCF 203. While not shown here, one or more other operations (e.g., selection of I-CSCF 203 from a set of candidate I-CSCFs, performing a Domain Name Service ("DNS") query to locate I-CSCF 203, etc.) may occur before P-CSCF 201 forwards (at 212) the SIP message to I-CSCF 203. I-CSCF 203 may prioritize (at 214) the SIP message based on the priority class indicated in the RPH. For example, as similarly discussed above, I-CSCF 203 may place the SIP message in a queue associated with the priority class, and/or may otherwise handle the SIP message in a prioritized manner in accordance with the priority class indicated in the RPH.

As further shown, I-CSCF 203 may forward (at 216) the SIP message, with the RPH, to S-CSCF 205, which may also prioritize (at 218) the SIP message according to the priority class indicated in the RPH. As similarly mentioned above, one or more other operations (e.g., a selection and/or identification of S-CSCF 205 from a set of candidate S-CSCFs) may occur prior to the forwarding (at 216) of the SIP message.

S-CSCF 205 may forward (at 220) the SIP message toward a destination of the SIP message. For example, S-CSCF 205 may forward the SIP message to a MAS, which may perform further processing and/or deliver the message to (or toward) an intended recipient of the SIP message. In some embodiments, S-CSCF 205 may forward the SIP message with the RPH header, based on which a recipient of the SIP message (e.g., an MAS and/or some other device or system), may prioritize the SIP message based on the priority class indicated in the RPH. In some embodiments, S-CSCF 205 may remove the RPH prior to outputting (at 220) the SIP message, and/or may encapsulate some or all of the SIP message into some other type of message (e.g., a message according to a different protocol or layer).

In some embodiments, in lieu of (or in addition to) inserting (at 210) an RPH for SIP messages from UE 101, P-CSCF 201 may provide the PCI and/or other indicator of UE priority class to I-CSCF 203 and/or S-CSCF 205. For example, based on receiving (at 202) the SIP REGISTER message with the PCI, P-CSCF 201 may output, to I-CSCF 203 and/or S-CSCF, a message (e.g., a SIP message) with the PCI and/or other indicator of UE priority class. The message may include an identifier associated with UE 101, such as a SIP Contact URI associated with UE 101 and/or other identifier (e.g., MDN, IMSI, and/or some other identifier). In some embodiments, P-CSCF 201 may provide the PCI (or other indicator of UE priority class) to I-CSCF 203, which may in turn forward the PCI (or other indicator of UE priority class) to S-CSCF 205. Additionally, or alternatively, P-CSCF 201 (and/or some other device or system) may provide the PCI (or other indicator of UE priority class) to a database or other type of information repository, which may be queried by I-CSCF 203 and/or S-CSCF 205 when receiving a SIP message. The PCI or other indicator of UE priority class may be provided with identifying information of UE 101, such as an MIDN, IMSI, etc., and may be provided via, for example, a SIP Authorization header (e.g., in a "username" part of the SIP Authorization header) of a SIP REGISTER message.

When receiving a SIP message, I-CSCF 203 and/or S-CSCF 205 may determine a SIP Contact URI and/or other identifier of UE 101, and query the database or information repository (e.g., using DIAMETER protocol messaging and/or some other suitable protocol) for a PCI or other indicator of UE priority class based on the identifier of UE 101. In some embodiments, after querying the database or information repository, I-CSCF 203 and/or S-CSCF 205 may maintain the UE priority information locally, such that future queries are not needed.

Figure 6:
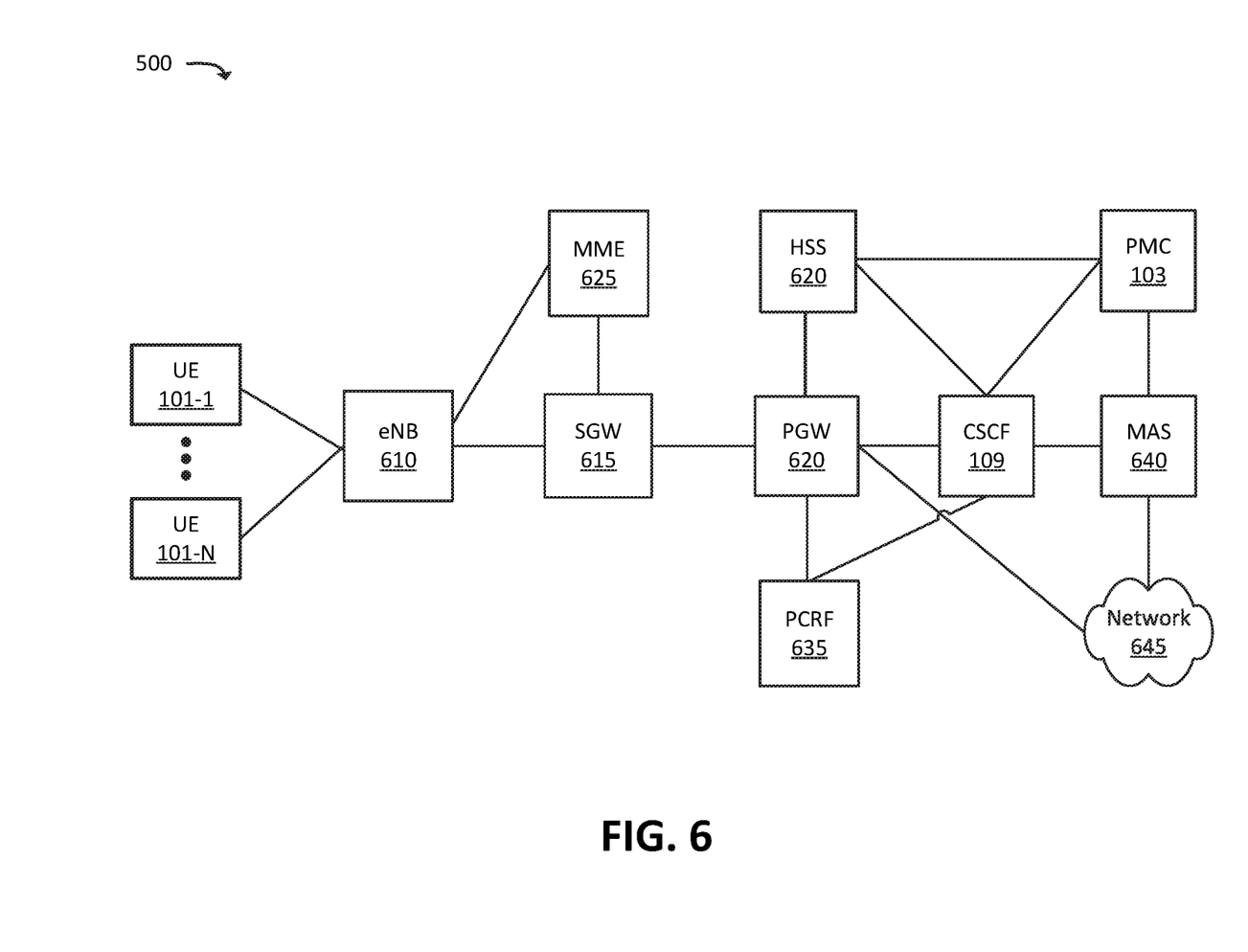
FIG. 6 illustrates an example environment in which one or more embodiments, described herein, may be implemented.

FIG. 6 illustrates an example environment 600, in which systems and/or methods described herein may be implemented. Environment 600 may include UEs 101-1 through 100-N (referred to individually as "UE 101" and collectively as "UEs 101"), one or more radio access networks ("RANs"), a wireless telecommunication core network, and one or more external networks. The wireless telecommunication core network may include an Evolved Packet System ("EPS") that includes a Long-Term Evolution ("LTE") network and/or an evolved packet core ("EPC") network that operates based on a 3rd Generation Partnership Project ("3GPP") wireless communication standard. The LTE network may be, or may include, RANs that include one or more base stations, some or all of which may take the form of evolved Node Bs ("eNBs") 610, via which UEs 101 may communicate with the EPC network.

The EPC network may include Serving Gateway ("SGW") 615, Packet Data Network ("PDN") Gateway ("PGW") 620, Mobility Management Entity ("MME") 625, HSS 620, and Policy and Charging Rules Function ("PCRF") 635. The EPC network may enable UEs 101 to communicate with one or more external networks, such as a Public Land Mobile Networks ("PLMN"), a Public Switched Telephone Network ("PSTN"), and/or an Internet Protocol ("IP")-based network (e.g., the Internet).

The wireless telecommunications network may also include an IP multimedia subsystem ("IMS") core, which may include (and/or be communicatively coupled with) CSCF 109, MAS 640, and PMC 103. The IMS core may facilitate the delivery of IP-based multimedia services, such as Voice over IP ("VoIP") services, text-based messaging (e.g., Short Message Service ("SMS") messaging, Multimedia Messaging Service ("MIMS") messaging, or the like), video calling services, etc., to UEs 101. The IMS core may operate based on one or more 3GPP wireless communication standards. While shown here in the context of being communicatively coupled to an EPC network, in some embodiments, the IMS core (e.g., CSCF 109 and/or one or more other devices of the IMS core) may be communicatively coupled to another type of network, such as a Fifth Generation ("5G") core network (and/or a network that implements or supports multiple types of core networks).

UE 101 may include a portable computing and communication device, such as a personal digital assistant ("PDA"), a "smart" phone, a cellular phone, a laptop computer, a tablet computer, etc. UE 101 may also include a non-portable computing device, such as a desktop computer, a consumer or business appliance, a "smart" television, or another device that has the ability to connect to the wireless telecommunications network. UE 101 may, in some embodiments, include a computing and communication device that may be worn by a user (also referred to as "wearable" devices) such as a watch, a fitness band, a necklace, glasses, a ring, a belt, a headset, and/or another type of wearable device.

As further shown, eNB 610 may include one or more network devices that receive, process, and/or transmit traffic, such as voice calls and data, destined for and/or received from UE 101. Additionally, eNB 610 may receive traffic from and/or send traffic to external networks or other devices via SGW 615 and PGW 620. Furthermore, eNB 610 may send traffic to and/or receive traffic from UEs 101 via an air interface.

SGW 615 may include one or more devices or systems that aggregate traffic received from one or more eNBs 610 and send the aggregated traffic to another network or device via PGW 620. Additionally, SGW 615 may aggregate traffic received from one or more PGWs 620 and may send the aggregated traffic to one or more eNBs 610. SGW 615 may operate as an anchor for user plane traffic during inter-eNB handovers and as an anchor for mobility between different telecommunication networks.

PGW may include one or more devices or systems that serve as an interface between the core network and one or more external networks, devices, or systems. PGW 620 may, for example, aggregate traffic received from one or more SGWs 620, and may send the aggregated traffic to an external network or another device. PGW 620 may also, or alternatively, receive traffic from an external network and may send the traffic toward UE 101 (via SGW 615 and/or eNB 610).

MME 625 may include one or more devices or systems that act as a control node for eNB 610 and/or other devices that provide the air interface for the wireless telecommunications network. For example, MME 625 may perform operations to register UE 101 with the wireless telecommunications network, to establish bearer channels associated with a session with UE 101, to hand off UE 101 to a different eNB 610, MME 625, or another network, and/or to perform other operations.

HSS 620 may include one or more devices or systems that manage, update, and/or store, in a memory associated with HSS 620, profile information associated with a user or subscriber (e.g., a subscriber associated with UE 101). The profile information may identify applications and/or services that are permitted for and/or accessible by the subscriber, identifying information for UE 101 (e.g., MDN, IMSI, IMEI, etc.), bandwidth or data rate thresholds associated with the applications and/or services, priority class information, and/or other information. Additionally, or alternatively, HSS 620 may perform authentication, authorization, and/or accounting operations associated with the subscriber and/or a communication session with UE 101. In some embodiments, HSS 620 may be an instance of, may implement, may be implemented by, and/or be in communication with one or more devices or systems that implement SIR 107.

PCRF 635 may include one or more devices or systems that store information regarding policies and/or subscriptions from one or more sources, such as subscriber databases and/or from one or more users. PCRF 635 may provide these policies to PGW 620 or another device so that the policies can be enforced.

CSCF 109 may include one or more devices or systems that gather, process, search, store, and/or provide information in a manner described herein. CSCF 109 may process and/or route messages, calls, etc. to and/or from UE 101 via the EPC. For example, CSCF 109 may process messages or calls, received from an external network, that are destined for UE 101. In another example, CSCF 109 may process messages and/or calls, received from UE 101, that are destined for the external network.

In some embodiments, CSCF 109 may handle messages in a prioritized manner. For example, CSCF 109 may prioritize messages that are associated with a UE 101 for which CSCF 109 stores information indicating a particular priority class and/or messages that include an RPH, as described herein.

PMC 103 may include one or more devices or systems that gather, process, search, store, and/or provide information in a manner described herein. In some embodiments, PMC 103 may communicate with UE 101 and/or another device or system to register UE 101 with one or more priority classes, in accordance with some embodiments described herein. For example, PMC 103 may be associated with a web portal or other user interface ("UI") via which an owner and/or operator of the network may associate UE 101 with one or more priority classes, and PMC 103 may store the information associating UE 101 with the one or more priority classes. PMC 103 may be communicatively coupled to CSCF 109, HSS 620, and/or MAS 640 (e.g., via an external network, such as the Internet, and/or some other type of interface or connection). In some embodiments, some or all of the functionality of PMC 103 may be implemented by one or more of CSCF 109, HSS 620, and/or MAS 640. By way of the communicative coupling to, and/or the implementation by, CSCF 109, HSS 620, and/or MAS 640, these devices and/or systems may be able to retrieve and/or store the priority class information for one or more UEs 101.

MAS 640 may include one or more devices that may store, forward, convert, and deliver messages. In some embodiments, MAS 640 may include, may be communicatively coupled to, and/or be implemented by an SMS Center ("SMSC"). In some implementation, MAS 640 may receive and respond to instructions from UE 101 to send a message (e.g., an SMS message and/or some other type of message) to another UE 101. MAS 640 may include, and/or communicate with, a messaging gateway for communicating with one or more other messaging gateways (e.g., a messaging gateway of another network). In some embodiments, MAS 640 may handle messages in a prioritized manner, such as messages that include an RPH.

Network 645 may include one or more wired and/or wireless networks. For example, network 645 may include an IP-based PDN, a wide area network ("WAN") such as the Internet, a private enterprise network, and/or one or more other networks. UE 101 may communicate, through network 645, with data servers, other UEs 101, and/or to other servers or applications that are coupled to network 645. Network 645 may be connected to one or more other networks, such as a public switched telephone network ("PSTN"), a public land mobile network ("PLMN"), and/or another network. Network 645 may be connected to one or more devices, such as content providers, applications, web servers, and/or other devices, with which UE 101 may communicate.

The quantity of devices and/or networks, illustrated in FIG. 6, is provided for explanatory purposes only. In practice, environment 500 may include additional devices and/or networks; fewer devices and/or networks; different devices and/or networks; or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more functions described as being performed by another device of environment 600. Additionally, the devices of environment 600 may interconnect with each other, and/or other devices, via wired connections, wireless connections, or a combination of wired and wireless connections. In some embodiments, one or more devices of environment 600 may be physically integrated in, and/or may be physically attached to, one or more other devices of environment 600. Also, while "direct" connections are shown in FIG. 6 between certain devices, some devices may communicate with each other via one or more additional devices and/or networks.

Figure 7:
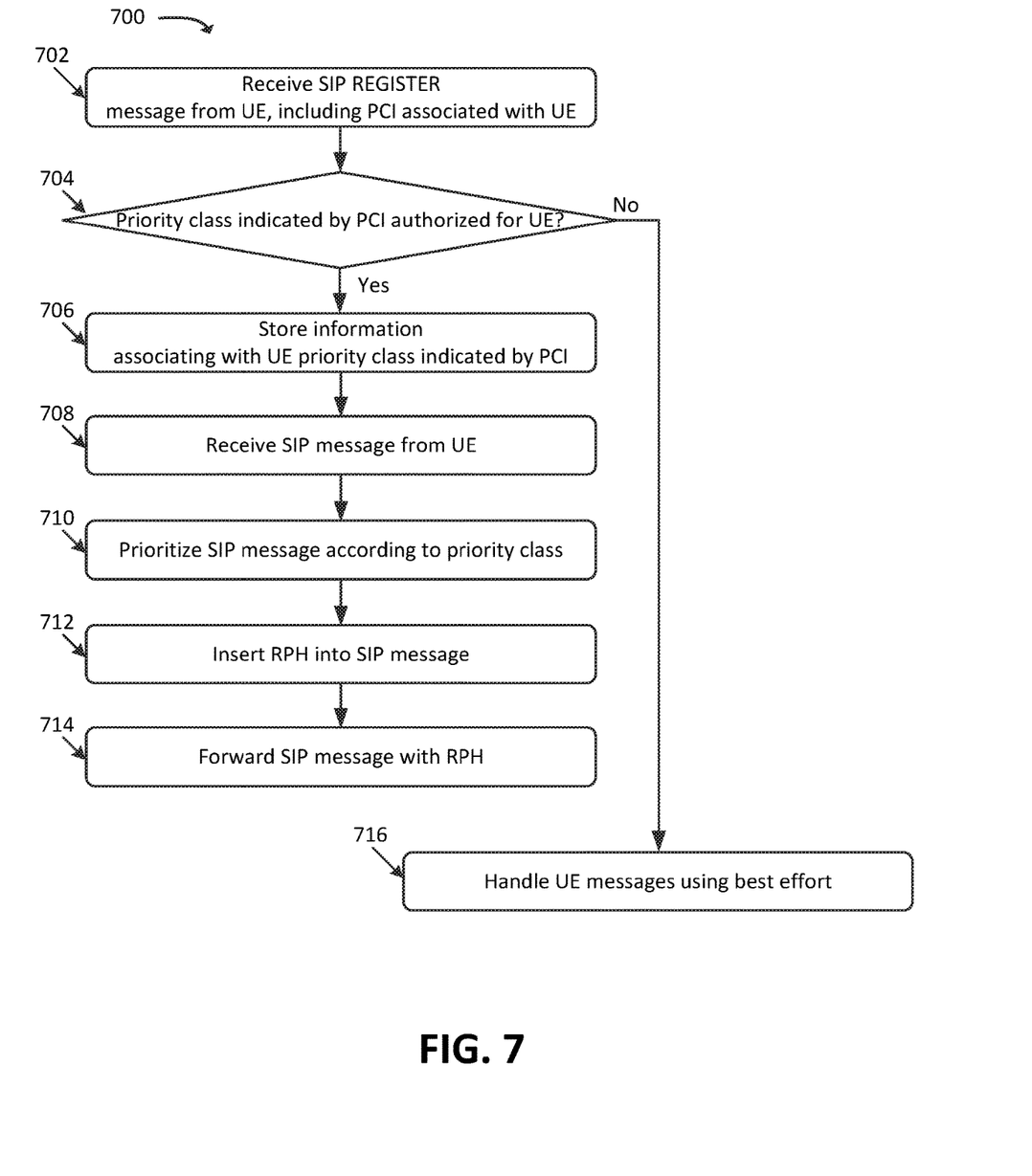
FIG. 7 illustrates an example process, which may be performed by a network component, for handling a message in accordance with a priority class indicated in the message.

FIG. 7 illustrates a process 700 for indicating a priority class in a message to be sent, in accordance with embodiments described herein. In some embodiments, some or all of process 700 may be performed by CSCF 109. As mentioned above, CSCF 109 may include multiple functional components (e.g., P-CSCF 201, I-CSCF 203, and/or S-CSCF 205). In some embodiments, some portions of process 700 may be performed by some components of CSCF 109, while some portions of process 700 may not be performed by other components of CSCF 109.

As shown, process 700 may include receiving (at 702) a SIP REGISTER message from UE 101. For example, CSCF 109 (e.g., P-CSCF 201) may receive a SIP REGISTER message from UE 101, where the SIP REGISTER message includes a PCI. As mentioned above, the PCI may indicate a priority class associated with UE 101.

Process 700 may also include verifying (at 704) whether UE 101 is authorized for the priority class indicated in the PCI. For example, CSCF 109 may query SIR 107, HSS 620, and/or PMC 103 to determine whether UE 101 is authorized for the indicated priority class.

If UE 101 is authorized for the indicated priority class (at 704—YES), process 700 may further include storing (at 706) information associating UE 101 with the priority class indicated by the PCI. For example, P-CSCF 201 may store a SIP Contact URI and/or some other identifier associated with UE 101 with the information indicating the priority class associated with UE 101.

Process 700 may further include receiving (at 708) a SIP message from UE 101. As mentioned above, the SIP message may be, or may include, a call setup request, a text-based message, and/or some other suitable type of message.

Process 700 may additionally include prioritizing (at 710) the SIP message according to the indicated priority class. For example, P-CSCF 201 may identify that a sender of the SIP message (e.g., as based on a SIP Contact URI included in the SIP message) matches information associating UE 101 with the priority class (e.g., as stored at 706). P-CSCF 201 may prioritize the queueing, forwarding, or other processing/handling of the message over messages that have a lower priority class (or no priority class, such as "best effort" traffic).

Process 700 may further include inserting (at 712) an RPH into the SIP message. For example, as similarly described above, P-CSCF 201 may insert an RPH into the SIP message that indicates the priority class associated with UE 101.

Process 700 may also include forwarding (at 714) the SIP message, with the RPH, toward a destination of the message. For example, as similarly discussed above, P-CSCF 201 may forward the message (including the RPH) to I-CSCF 203, which may prioritize the message according to the RPH, and forward the message to S-CSCF 205. S-CSCF 205 may also prioritize the message according to the RPH, and forward the message toward a recipient of the message (e.g., to MAS 640 and/or some other device or system).

If UE 101 is not authorized for the priority class indicated in the SIP header (at 704—NO), then process 700 may include handling (at 716) the SIP message as "best effort" traffic. For example, CSCF 109 may not prioritize messages from UE on the basis of the PCI (received at 702), as the PCI was not verified.

Figure 8:
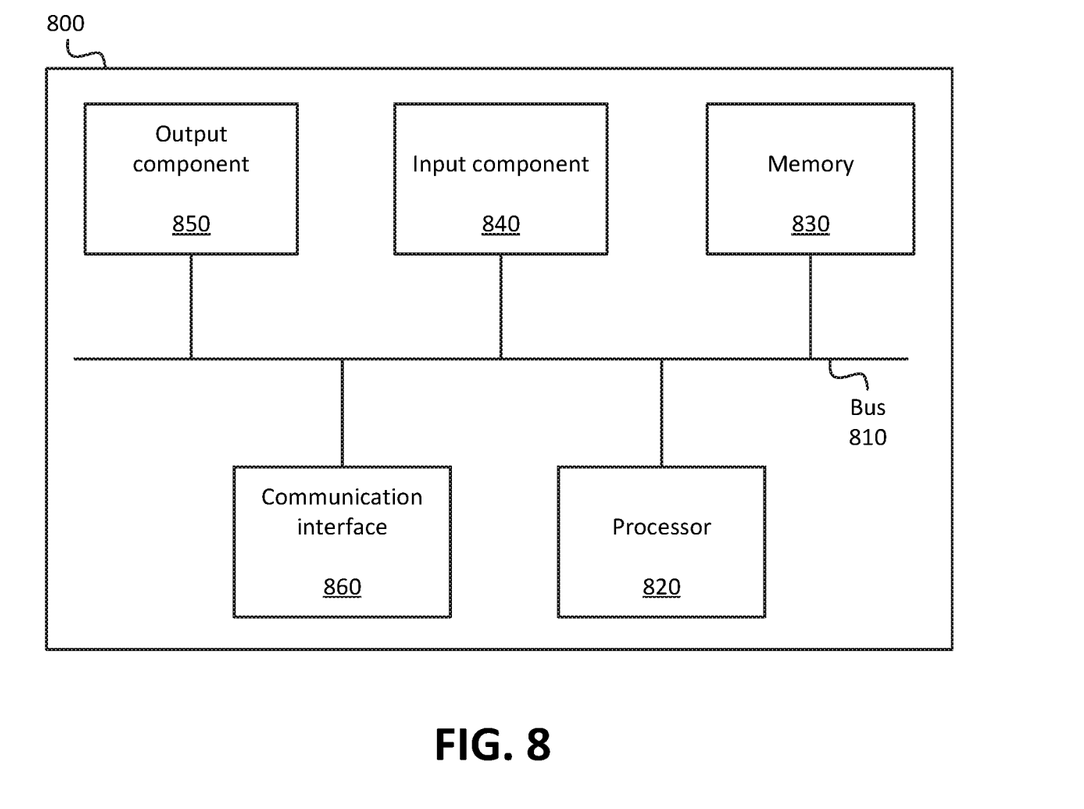
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, 2, and 7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      receive a first message from a User Equipment ("UE"), the first message including:
         a registration request according to a Session Initiation Protocol ("SIP") messaging protocol, and
         an indicator of a particular priority class, out of a plurality of candidate priority classes, associated with the UE;
      store information indicating the particular priority class associated with the UE, as indicated in the received first message;
      receive a second message from the UE;
      identify, based on receiving the second message from the UE and based on the stored information, that the UE is associated with the particular priority class;
      in response to identifying that the UE is associated with the particular priority class, prioritize the second message over one or more other messages from other UEs associated with a lower priority class than the particular priority class of the UE, the prioritizing including inserting a Resource Priority Header ("RPH") into the second message, wherein the RPH indicates the particular priority class associated with the UE; and
      output the prioritized second message, including the RPH, to one or more devices, wherein the one or more devices of the network prioritize the second message based on the particular priority class indicated in the RPH.

2. The device of claim 1, wherein the registration request includes a SIP REGISTER message.

3. The device of claim 2, wherein the indicator of the particular priority class is included in a contact header of the SIP REGISTER message.

4. The device of claim 2, wherein the indicator of the particular priority class is included in a SIP Contact Uniform Resource Identifier ("URI") of the SIP REGISTER message.

5. The device of claim 1, wherein the device is associated with an Internet Protocol ("IP") Multimedia Subsystem ("IMS") core network.

6. The device of claim 5, wherein the device includes a Proxy Call Session Control Function ("P-CSCF") associated with an IMS core network, wherein the one or more devices include at least one of:
   an Interrogating CSCF ("I-CSCF") associated with the IMS core network, or
   a Serving CSCF ("S-CSCF") associated with the IMS core network.

7. The device of claim 5, wherein the device includes a Call Session Control Function ("CSCF").

8. A non-transitory computer-readable medium, storing a plurality of processor-executable instructions to:
   receive a first message from a User Equipment ("UE"), the first message including:
      a registration request according to a Session Initiation Protocol ("SIP") messaging protocol, and
      an indicator of a particular priority class, out of a plurality of candidate priority classes, associated with the UE;
   store information indicating the particular priority class associated with the UE, as indicated in the received first message;
   receive a second message from the UE;
   identify, based on receiving the second message from the UE and based on the stored information, that the UE is associated with the particular priority class;
   in response to identifying that the UE is associated with the particular priority class, prioritize the second message over one or more other messages from other UEs associated with a lower priority class than the particular priority class of the UE, the prioritizing including inserting a Resource Priority Header ("RPH") into the second message, wherein the RPH indicates the particular priority class associated with the UE; and
   output the prioritized second message, including the RPH, to one or more devices, wherein the one or more devices of the network prioritize the second message based on the particular priority class indicated in the RPH.

9. The non-transitory computer-readable medium of claim 8, wherein the registration request includes a SIP REGISTER message.

10. The non-transitory computer-readable medium of claim 9, wherein the indicator of the particular priority class is included in a contact header of the SIP REGISTER message.

11. The non-transitory computer-readable medium of claim 9, wherein the indicator of the particular priority class is included in a SIP Contact Uniform Resource Identifier ("URI") of the SIP REGISTER message.

12. The non-transitory computer-readable medium of claim 8, wherein the processor-executable instructions cause a Proxy Call Session Control Function ("P-CSCF"), associated with an Internet Protocol ("IP") multimedia subsystem ("IMS") core network, to perform the receiving the first message, the storing, the receiving the second message, the identifying, the prioritizing, the inserting, and the outputting the prioritized second message, wherein the one or more devices include at least one of:
 an Interrogating CSCF ("I-CSCF") associated with the IMS core network, or
 a Serving CSCF ("S-CSCF") associated with the IMS core network.

13. The non-transitory computer-readable medium of claim 8, wherein the RPH is inserted by a Call Session Control Function ("CSCF") associated with an Internet Protocol ("IP") Multimedia Subsystem ("IMS") core network.

14. A method, comprising:
 receiving a first message from a User Equipment ("UE"), the first message including:
  a registration request according to a Session Initiation Protocol ("SIP") messaging protocol, and
  an indicator of a particular priority class, out of a plurality of candidate priority classes, associated with the UE;
 storing information indicating the particular priority class associated with the UE, as indicated in the received first message;
 receiving a second message from the UE;
 identifying, based on receiving the second message from the UE and based on the stored information, that the UE is associated with the particular priority class; and
 in response to identifying that the UE is associated with the particular priority class, prioritizing the second message over one or more other messages from other UEs associated with a lower priority class than the particular priority class of the UE, the prioritizing including inserting a Resource Priority Header ("RPH") into the second message, wherein the RPH indicates the particular priority class associated with the UE; and
 outputting the prioritized second message, including the RPH, to one or more devices, wherein the one or more devices of the network prioritize the second message based on the particular priority class indicated in the RPH.

15. The method of claim 14, wherein the registration request includes a SIP REGISTER message.

16. The method of claim 15, wherein the indicator of the particular priority class is included in a contact header of the SIP REGISTER message.

17. The method of claim 15, wherein the indicator of the particular priority class is included in a SIP Contact Uniform Resource Identifier ("URI") of the SIP REGISTER message.

18. The method of claim 14, wherein a Proxy Call Session Control Function ("P-CSCF"), associated with an Internet Protocol ("IP") multimedia subsystem ("IMS") core network, performs the receiving the first message, the storing, the receiving the second message, the identifying, the prioritizing, the inserting, and the outputting the prioritized second message, wherein the one or more devices include at least one of:
 an Interrogating CSCF ("I-CSCF") associated with the IMS core network, or
 a Serving CSCF ("S-CSCF") associated with the IMS core network.

19. The method of claim 14, wherein the RPH is inserted by a device associated with an Internet Protocol ("IP") multimedia subsystem ("IMS") core network.

20. The method of claim 19, wherein the device associated with the IMS core network is a Call Session Control Function ("CSCF") device.

* * * * *